Patented Feb. 27, 1945

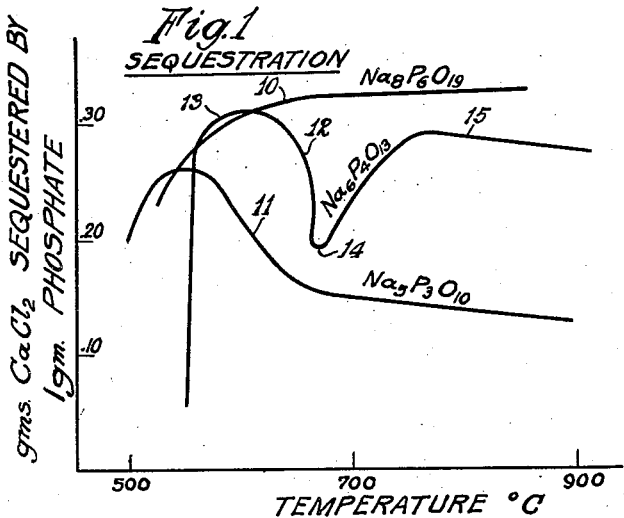
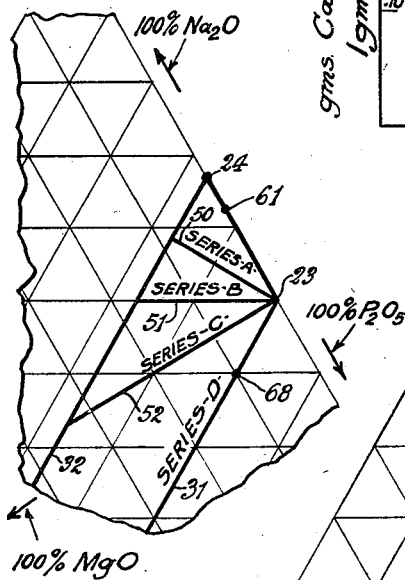
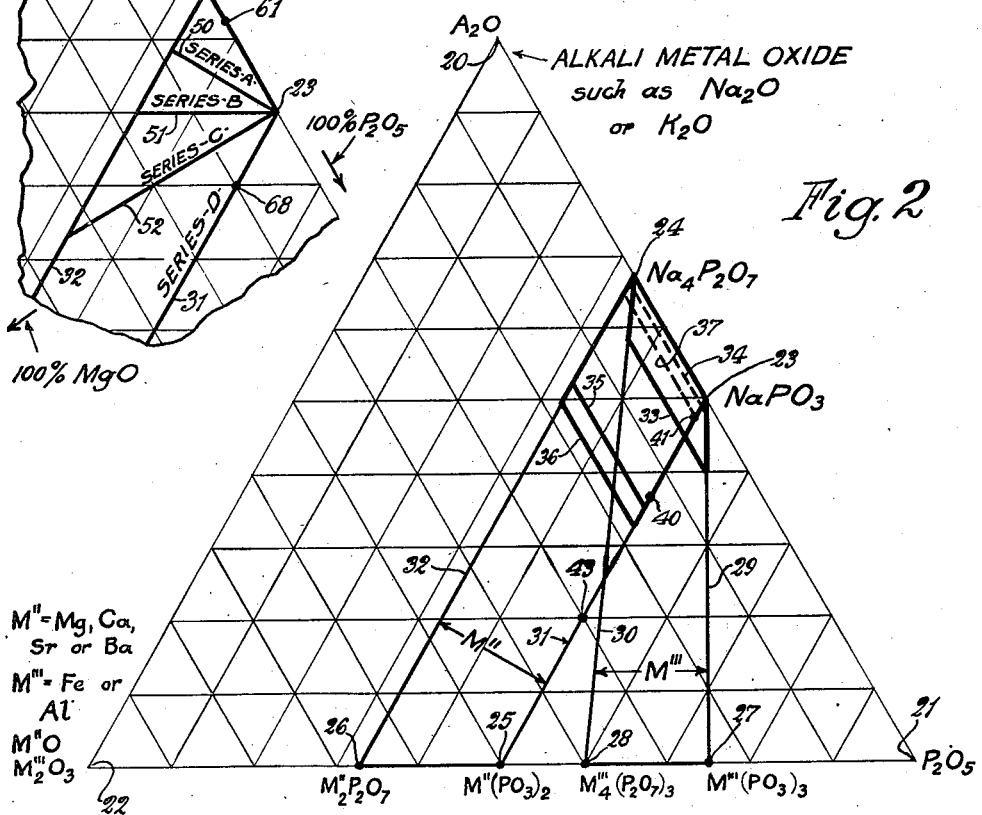
Inventor
Charles S. King
by W. Bartlett Jones,
Attorney.

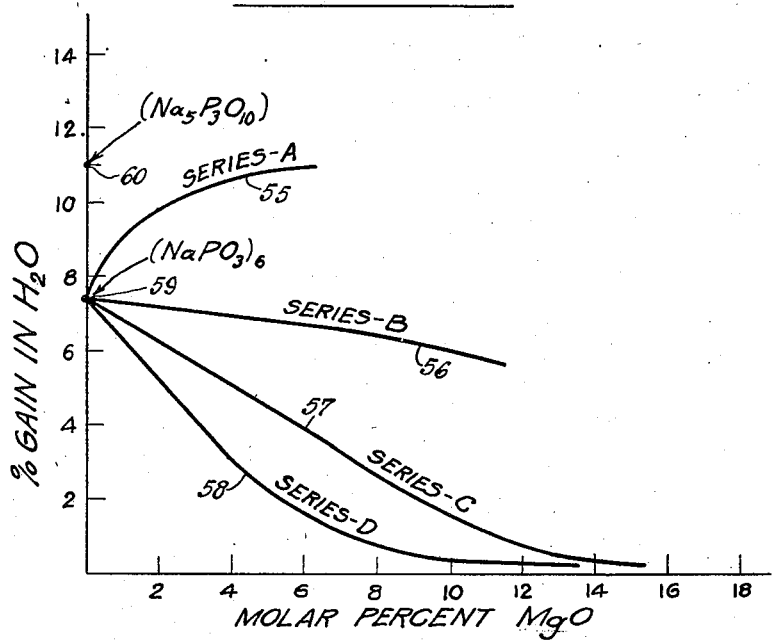
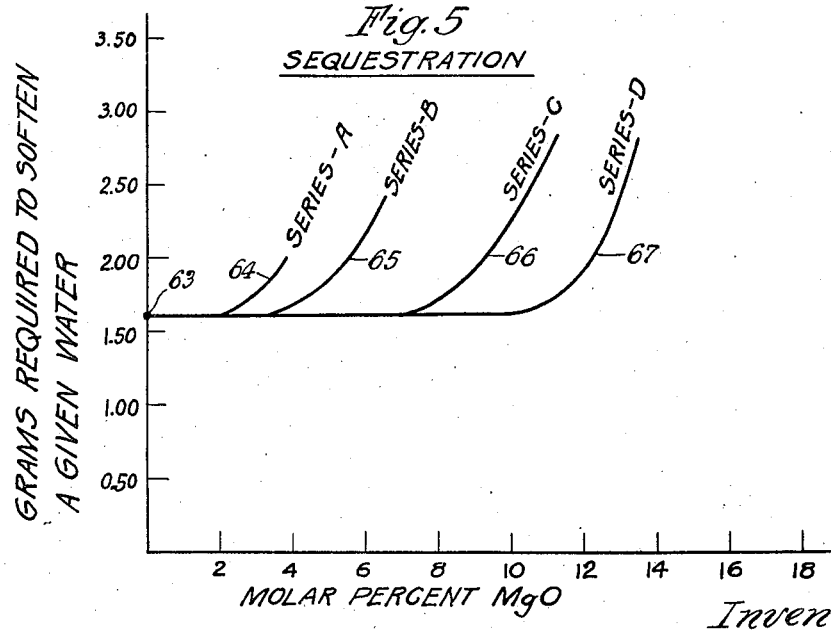

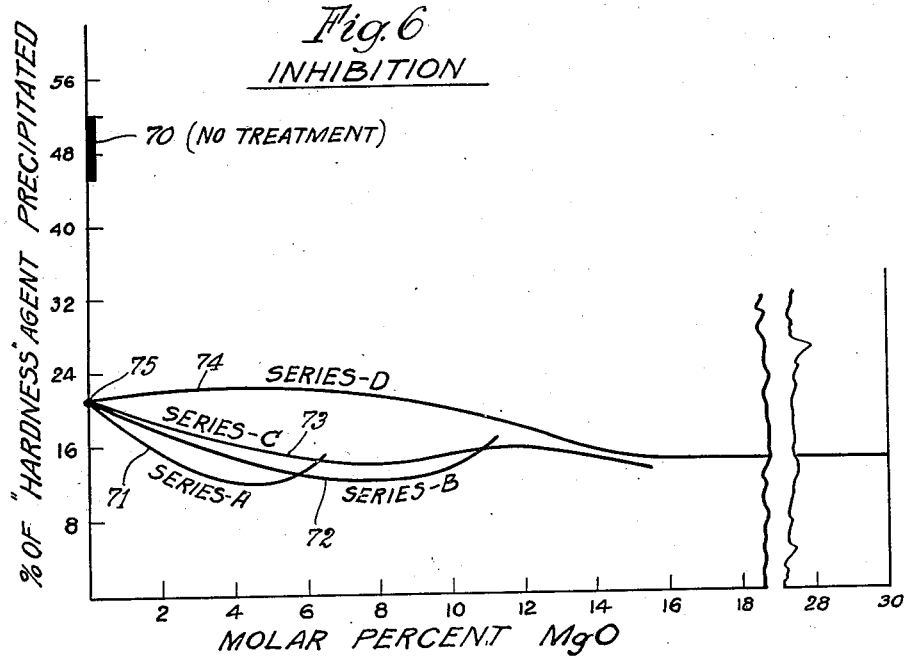
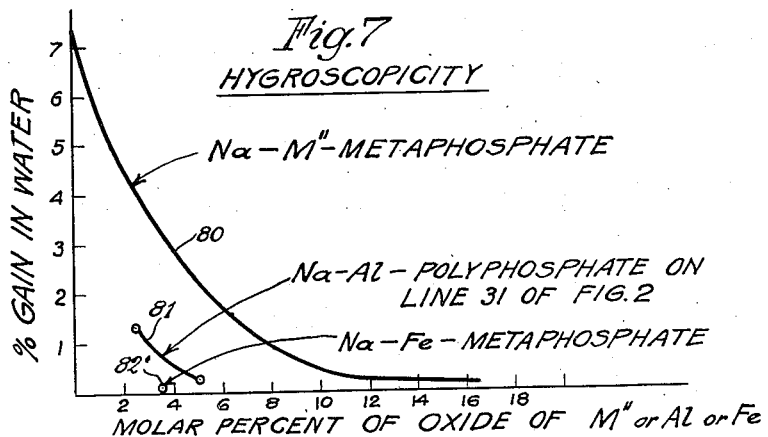
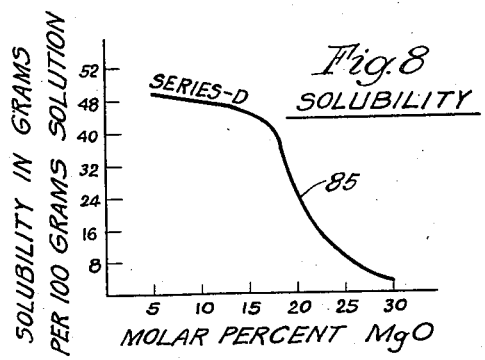

2,370,472

UNITED STATES PATENT OFFICE 2,370,472

VITREOUS COMPOSITIONS CONSISTING OF OXIDES OF ALKALI METAL, PHOSPHORUS, AND OTHER SELECTED DIVALENT METAL

Charles S. King, Joliet, Ill., assignor to Blockson Chemical Co., Joliet, Ill., a corporation of Illinois Application October 7, 1940, Serial No. 360,065

11 Claims. (Cl. 252—1)

The present invention relates to new chemical glass systems useful in the treatment of water, and to new chemical agents for the treatment of water and for other uses.

In particular, it relates to improvements in an art heretofore known, and to new methods and agents for said art. The treatment of water refers broadly to city supplies, boiler waters, waters for domestic uses, as for washing dishes and clothes, bathing and other purposes, and in general it relates to the "hardness" in such waters.

There is extensive knowledge and practice in the use of alkali metal polyphosphates to treat water. Reference is made to the following U. S. patents: Hall, No. 1,956,515, reissued as Re. 19,719, Hall No. 2,035,652, Rosenstein, No. 2,038,316, reissued twice as Re. 20,360 and Re. 20,754, and other U. S. patents, such as No. 2,156,173 to Bird, and No. 2,059,570 to Fiske, Warren and Bryan.

As a result of prior developments it is known that the water-soluble vitreous glasses comprising sodium oxide ($Na_2O$) and phosphorus pentoxide ($P_2O_5$) have valuable properties in treating water. The present invention relates to that portion of the prior art field which involves polyphosphates, and only the pertinent part of that field will be discussed for the purpose of explaining the present invention.

One of the functions of the vitreous products is to "sequester" calcium and magnesium from waters containing them. Another function of them is designated "inhibition."

Sequestration is the action of an agent which appears to render the calcium and magnesium content of the waters inert to reaction with soap. Sequestration in the prior art is believed to be the result of a reaction whereby the calcium or magnesium cations combine with the dissolved $Na_2O$—$P_2O_5$ polyphosphate to incorporate the calcium or magnesium into an anion radical, wherein it is inert to react with soap, and other agents which normally react with calcium cations, such as silicates, carbonates, phosphates and sulfate salts.

Inhibition in the prior art is the action of a very small quantity of dissolved $Na_2O$—$P_2O_5$ polyphosphate to prevent the precipitation of solid products from the original calcium or magnesium compounds in the waters.

Whereas sequestration involves stoichiometrical amounts of the treating phosphate and of the "hardness" impurities in the water, inhibition does not. Rather, it advantageously inhibits the precipitation of much more material than is stoichiometrically equivalent to the quantity of inhibiting agent used.

The prior art vitreous phosphates for such purposes are most commonly dissolved in water and the solution is then employed, or the solid compound is dissolved in all water to be treated. The agents have a high total solubility in water, and dissolve readily. Granular masses of the agent congeal on being wetted, due to a high hygroscopic nature. The hygroscopic character limits the utility of such agents, not in the chemical functioning, but in the mechanical procedures of using the agent. Also, they are quite unstable in solution at higher temperatures, limiting their efficiency in certain uses, as well as their utility.

The present invention aims to provide new agents which overcome one or more defects of these prior art agents while having their valuable water-treating properties, and in some cases with improvements in such properties.

It is an object of the invention to produce new chemical compositions of more complex nature for use as a substitute for such prior art treating agents, whereby new properties are exhibited, and whereby properties characterizing the prior art compositions are enhanced or diminished in desired directions.

Another object of the invention is to produce new agents of the type referred to with controlled properties dependent upon composition.

It is also an object of the invention to produce chemical glass systems which are polyphosphate salts comprising oxides of alkali metal and of metal from the group consisting of alkali-earth metals, magnesium, trivalent iron, and aluminum, regardless of the practical suitability for water-treating by methods practiced heretofore with alkali metal polyphosphates.

A particular object is to produce complexes of decreased hygroscopicity, increased stability, slower rate of solution, and non-congealing permanent granular form, without any substantial loss in value as water-treating agents.

It is still another object of the invention to produce a granular agent for treating water, such that the water to be treated may flow through a bed of the agent to effect the desired treatment, without use of excess of the agent, and without detrimental change in the porosity of the bed resulting from the action of the water on the agent.

Still another object of the invention is to produce a granular water-treating agent which may be used as a component of a dry mix without detriment to the mix through undesired hygroscopicity of the agent.

It is a general object of the invention to produce polyphosphate water-treating agents which incorporate alkali metal oxide and another metal oxide of kind and quantity selected for the particular properties which it may produce.

It is a particular object of the invention to produce new polyphosphate water-treating agents having alkali metal oxide and oxide of metal from the group consisting of magnesium, the alkali-earth metals, trivalent iron, and aluminum, said selected metal being herein referred to for convenience as M.

Various other and ancillary objects and advantages of the invention will become apparent from the following description and explanation of the invention, in connection with the accompanying drawings, in which:

Fig. 1 represents the effect of fusion temperature on the calcium-sequestering power of sodium polyphosphates.

Fig. 2 is a triangular coordinate graph of the new complexes of the present invention expressed in molar percents of alkali metal oxide, phosphorus pentoxide and a third oxide of metal.

Fig. 3 is a fragmentary portion of a graph like that of Fig. 2 where the alkali metal is sodium, and where the third oxide is of magnesium.

Figs. 4, 5 and 6 are graphs for the sodium-magnesium polyphosphates, showing respectively the properties referred to as hygroscopicity, sequestration, and inhibition.

Fig. 7 is a graph comparing the hygroscopicities of sodium-M-polyphosphates where the metal M is varied.

Fig. 8 is a graph showing the solubility of a certain series of glasses as they are affected by content of MgO.

SODIUM POLYPHOSPHATES

The art referred to has developed largely with the sodium polyphosphates. The metal-phosphate compounds are not of simple character like many other metal salts, and the actual character of the substance is not indicated by its simplest empirical formula. In order to predicate the invention later to be described, a brief reference to the nature of metal phosphates is in order, and is given below in connection with the prior art sodium polyphosphates.

The "sodium polyphosphates" as herein referred to in this art, are molecularly dehydrated phosphates varying from the ratio $1Na_2O$ to $1P_2O_5$ to the ratio $2Na_2O$ to $1P_2O_5$, or in other words varying within the system: sodium metaphosphate $(NaPO_3)$ to sodium pyrophosphate $(Na_4P_2O_7)$.

Sodium polyphosphates within this system form glasses by melting and cooling. The actual character of a glass, for example of $NaPO_3$, varies by polymerization, so that distinctive forms are known, having distinctive properties. Polymerization and depolymerization are controllable by the thermal treatment of the glass, for example, the rate of cooling the melt. Thus, there are known the following forms of $NaPO_3$:

$(NaPO_3)_1$—sodium monometaphosphate
$(NaPO_3)_3$—sodium trimetaphosphate
$(NaPO_3)_6$—sodium hexametaphosphate These are polymers. Quick cooling of a melt provides the hexametaphosphate. Various mixtures of polymers thus obtain as the cooling is varied. The mono-form is insoluble in water. The tri- and hexa-forms are soluble in water. Of the soluble masses, only the hexa-form is vitreous and accepted as having valuable properties for treating water for sequestration and inhibition.

Within the described system of sodium polyphosphates there are known definite compounds, the more common ones being shown in Table 1.

Table 1

| Moles of $NaPO_3$ | Moles of $Na_4P_2O_7$ | Formula | Name |
|---|---|---|---|
| 5 | 1 | $Na_9P_7O_{22}$ | Sodium heptapolyphosphate |
| 4 | 1 | $Na_8P_6O_{19}$ | Sodium hexapolyphosphate |
| 2 | 1 | $Na_6P_4O_{13}$ | Sodium tetrapolyphosphate |
| 1 | 1 | $Na_5P_3O_{10}$ | Sodium tripolyphosphate |

These polyphosphates likewise form polymers. As the general rule in the art, only those polymers of polyphosphates which result from quickly cooling the melted material have value as water-treating agents. They must be vitreous, with the exception that crystalline sodium tripolyphosphate may be used (see U. S. No. 2,174,614).

SODIUM POLYPHOSPHATES AS WATER-TREATING AGENTS

The effectiveness of the vitreous sodium polyphosphates is determined also by the temperature of the melt which is quickly cooled. The different identifiable polyphosphates do not respond identically to the variations in fusion temperature. I have determined the sequestering value of several polyphosphates made at varying fusion temperatures, and then quickly chilled to a glass. The variation is shown in Fig. 1 in which the temperature of the fusion is plotted horizontally, and the sequestering property is plotted vertically as parts by weight of calcium chloride $(CaCl_2)$ sequestered by 1 part by weight of the polyphosphate indicated on the curves. The tests were made with water having 1 gram of $CaCl_2$ per 150 cc. The phosphate complex was dissolved at 4 grams in 100 cc. The water was titrated with the polyphosphate solution. At first a precipitate occurs, which is then taken up by added polyphosphate. When the precipitate is dissolved, the titration is complete. From the data the amount of calcium sequestered by 1 gram of the polyphosphate is calculated.

In Fig. 1 curve 10 indicates the sequestering power of sodium hexapolyphosphate. It attains a maximum with increasing fusion temperature, and increasing the temperature does not affect it. Curve 11 shows the property for sodium tripolyphosphate. It has its maximum sequestering power when cooled from about 550° C. Higher temperatures of melting lessen the power of the resulting product. Curve 12, represents the sequestering power of sodium tetrapolyphosphate. It has a maximum 13 when cooled from about 600° C., falling off rapidly to a low point at 14 at about 675° C., then rising to a higher point 15, below the said maximum 13 at about 760° C.

The sequestration power for calcium may be different from the sequestration power for magnesium. I have found that for calcium sequestration, the power decreases in the system from $(NaPO_3)_6$ to $Na_4P_2O_7$, the latter being relatively a poor agent and of practical value only for waters very low in calcium hardness. Yet for sequestering magnesium, the above given extremes show about the same effectiveness.

For inhibition, much has been published regarding sodium metaphosphates, but I have found that the value of polyphosphates in the system from $NaPO_3$ to $Na_4P_2O_7$ is about the same as for $NaPO_3$.

OBJECTIONS TO SODIUM POLYPHOSPHATES

The sodium polyphosphate glasses having power of sequestration and inhibition have objectionable qualities physically, and the uses of them to utilize their chemical properties are thereby limited. They are extremely water soluble, not in the sense that sugar and salt are soluble, for they do not dissolve that fast. They are however, so soluble that a mass of the product cannot be used to pass water over it for dissolving a minimum amount to effect the required water treatment. More than is needed is dissolved, because of the rate of solution of the glass. With a suitably lower rate of solution, new methods of treatments may be employed.

Another defect is the gelling power of the glasses. When wet with water they lose the granular or glassy form and become gelatinous, causing particles to stick together into a solid mass. Consequently it is not possible, on this account alone, to pass water through a bed of the material. The rapid rate of solution is also another handicap to such use.

The sodium polyphosphates in hot water revert quite rapidly to ineffective orthophosphates. On such account certain desirable uses of the agents are prevented, and in other uses employ the material inefficiently.

When a glassy sodium polyphosphate is powdered, as is desirable to make it a dry powder or a component of a dry mixture, for water-treatment, the powder is so hygroscopic that it causes the mass to congeal, if exposed to water or to water-bearing or hydrated compounds of a mixture, or to a humid atmosphere. As a result of these defects, the application of the sodium polyphosphates for treating water, is limited largely to dissolving the glasses and adding the solution to the water to be treated.

These defects are not only true of sodium polyphosphates, but of potassium polyphosphates and other alkali metal polyphosphates. Because of these defects common to alkali-metal polyphosphates, and because of the less expensive sodium base, practically, the art has been developed and studied, to use the sodium polyphosphates.

Attempts have been made heretofore to overcome some of these objectionable properties, especially to overcome hygroscopicity. Coating the particles with a sodium phosphate or intumesced borax have helped somewhat (see U. S. No. 2,008,561 and No. 2,024,543), but these only add surplus chemical to the treated water, beyond that required for sequestering or inhibition.

IMPROVED POLYPHOSPHATES

According to the present invention the objectionable features are lessened or absent in a new series of vitreous polyphosphates in which alkali-metal oxide remains as an important and essential constituent, and in which varying quantities of other oxides are present from the group of metals consisting of magnesium, calcium, strontium, barium, aluminum and iron. By selection of the composition, the hygroscopicity and the rate of solution may be controlled, and the gelling may be controlled or stopped. Thereby, new methods of application of the polyphosphates have been opened up, and new mixtures are permitted. For example, a granular bed of a chosen composition may be used to pass water through it, at a controlled rate, so that the water dissolves just sufficient of the agent to effect the desired treatment, and the bed retains its granular form, requiring only renewal by adding more of the granular compound to replace that dissolved.

According to the present invention in the broadest aspects, new compounds may be prepared which have objectionable features like the sodium polyphosphates, yet which have greater powers of sequestering or inhibition, or both, and different combinations of such powers for calcium and magnesium. In other words, the invention not only permits making compounds with improved chemical properties over the prior art sodium polyphosphates, and with the same character of objectionable physical properties, but it also permits making compounds with the same character of advantageous chemical properties and without the disadvantageous physical properties, considered singly or in combinations. Various degrees of combinations of these improvements are possible within the scope of the present invention.

For convenience in simply explaining the present invention the compounds are represented as containing three basic ingredients, whereby the scope of the invention may be graphically illustrated on triangular coordinate charts. The ingredients are:

(1) $P_2O_5$
(2) Alkali metal oxide, such as $Na_2O$ or $K_2O$
(3) Metal oxide, such as $MgO$, $CaO$, $SrO$, $BaO$, $Al_2O_3$ and $Fe_2O_3$ It is not intended by this system of description and explanation to indicate that but one of the oxides of (2) or of (3) above must be used, and it will be shown that more than one may be used. However, in order better to study and explain the effect of variables, it has been considered best to study the simple systems, as will be apparent hereafter.

In carrying out the invention, any composition to provide the desired ratio of the oxides desired, is fused until molecular dehydration is complete. The temperature is such that a complete fusion occurs and such that upon quickly cooling a clear vitreous glass results. Overheating has no bad effects. Cooling small masses quickly is readily accomplished and assures clear glasses. By slowing the rate of cooling, crystallization can occur. A small amount of crystallization may destroy clarity, giving an opalescence or cloudy effect, caused by inclusion of water-insoluble crystals in the water-soluble vitreous phase. The crystal portion is not of value and hence such cloudiness is preferably avoided, or accepted when not so great as to impair the efficiency of the compound.

By making many compounds, testing their physical and chemical properties, and plotting the successful compounds on triangular coordinate paper, I have found that a definite relation exists. Just as there is a range of composition between 100% $Na_2O$ and 100% $P_2O_5$ including the intermediate mixtures, in which range the intermediate range from $NaPO_3$ to $Na_4P_2O_7$ represents the water-treating sodium polyphosphates, there is also a like range for other metals. Thus for the bivalent metals, Ca, Sr, Ba and Mg, represented hereinafter by $M''$, there is a range of $M''$-polyphosphates from $M''(PO_3)$ to $M''_2P_2O_7$. For the trivalent metals Fe and Al, represented hereinafter by $M'''$, there is a range of $M'''$-polyphosphates $M'''(PO_3)_3$ to $M'''_4(P_2O_7)_3$. I have found that when a triangular coordinate chart is made at which one vertex represents 100 molar percent of alkali-metal oxide, alkali metal being hereinafter represented by A, and its oxide being $A_2O$; another vertex representing 100 molar percent of $P_2O_5$, and the third vertex representing 100 molar percent of the metal oxide $M''O$ or $M'''_2O_3$, I may connect with straight lines the corresponding terminals of the A-polyphosphate range and the respective M-polyphosphate ranges, as boundaries for the respective areas of the chart in which lie the compositions of the invention. Thus, I have found that the compositions may be considered analytically as corresponding to a product made from A-polyphosphates and M-polyphosphates, without commission to the proposition that such definite compounds are present as such and independent of each other.

I have found that the M-polyphosphates do not possess water-treating qualities, and that new compositions only lose practical value as water treating agents when the solubility becomes limited for some practical usage. As the complex approaches the line of M-polyphosphates in the chart referred to, the water-solubility decreases, and other properties change, so that considering the practical utilities of the compositions from one or more particularly useful properties, there are practical limits of composition for the preferred and practical complexes. However, these are not necessarily functional limits, nor limits of the invention. The invention therefore contemplates broadly those new complexes which are either water-soluble, or too water-insoluble, to function practically. The invention also contemplates, and more specifically, limits for preferred compositions dictated by actual observations on the property values.

These practical limits are variable according to the specific character of the metal M. When M is trivalent, the molar percent of $M'''_2O_3$ is preferred not to exceed 5% in order to provide a practically valuable water-treating agent. Where the metal M is magnesium, the molar percent of MgO is preferred not to exceed 15% for the same reason. Where the metal M is alkali earth metal, the molar percent is preferred not to exceed 17.5% for the same reason.

When there is but a slight amount of metal (M) oxide in the new compositions, an improvement over a corresponding sodium polyphosphate is found, which is marked for some qualities and slight for others. In one case, as is pointed out later, a complex having at little as 1 molar percent of $Al_2O_3$ in a sodium-aluminum-polyphospate, has a hygroscopicity one-fifth of that of the corresponding sodium polyphosphate. In other cases the variations in a single property are not so obvious or detectable for small usages of metal M. Where an important property, or a combination of several properties, is apparent at some low content of metal M, that is taken as a lower limit for the preferred practical complexes. I have determined that in the case of using an oxide of M the improvements over sodium polyphosphates for water-treatment are of generally practical utility when the molar percent of $M'''_2O_3$ is as low as 1%, and when the molar percent of $M''O$ is as low as 2.5%. However, I do not exclude from the scope of the invention complexes having M-oxide below these preferred practical limits.

I have represented the extent of the improvements in Fig. 2, upon a triangular coordinate graph. The vertex 20 represents alkali-metal oxide in molar percent of 100. The vertex 21 represents $P_2O_5$ in molar percent of 100. The vertex 22 represents oxide of metal $M''$ or $M'''$ in molar percent of 100.

Point 23 represents the complex $APO_3$ such as $NaPO_3$.
Point 24 represents the complex $A_4P_2O_7$ such as $Na_4P_2O_7$.
Point 25 represents the complex $M''(PO_3)_2$.
Point 26 represents the complex $M''_2P_2O_7$.
Point 27 represents the complex $M'''(PO_3)_3$.
Point 28 represents the complex $M'''_4(P_2O_7)_3$.

Line 23—24 represents the alkali-metal polyphosphates of the prior art.

Lines 25—26 and 27—28 represent the locations on the chart for polyphosphates respectively of $M''$ and $M'''$.

Lines connecting the terminals of the ranges of the M-polyphosphates to the range of alkali-metal polyphosphates are drawn and are designated 29, 30, 31 and 32.

Lines 29 and 30 form a zone on the chart in which lie the complexes of the present invention involving $M'''$ metal, or Fe and Al. In this zone I have found that line 33 generally defines the upper limit for the preferred practical water-treating complexes, at about 5 molar percent of the oxide of iron or aluminum in the complex. Dotted line 34 in this zone defines the line of lower molar percent, at about 1%, of oxide of iron or aluminum, where the benefits of its presence are obviously apparent and sufficiently practical to warrant using compositions lying on the line 34 for water-treating. I do not intend to exclude from the scope of the invention complexes lying in the zone between lines 29 and 30 and between the line 34 and line 23—24, the preferred and practical water-treating compositions lying in the said $M'''$-zone between lines 33 and 34.

Lines 31 and 32 define a zone wherein lie the complexes of the present invention having bivalent metal $M''$, of which the alkali earth metals Ca, Sr, and Ba form one class and Mg forms another. In this zone I have found that line 35 generally defines the upper limit for the preferred practical water-treating complexes, of about 15% molar percent of MgO in the complex. The like limit for molar percent of oxide of Ca, Sr, or Ba is about 17.5%, represented by line 36 in the $M''$-zone between lines 31 and 32.

Dotted line 37 in this zone defines the line of lower molar percent, at about 2.5%, of oxide of Mg, Ca, Sr, or Ba, where the benefits of its presence are obviously apparent and sufficiently practical to warrant using compositions lying on the line 37 for water-treating. I do not intend to exclude from the scope of the invention complexes lying between lines 37 and 23—24 in the $M''$-zone, the preferred and practical water-treating compositions lying in the $M''$-zone between the line 37 and the lines 35 or 36.

ALKALI-METAL

Heretofore the alkali-metal polyphosphates have been practically limited to sodium. Potassium may be used, but its compounds are higher melting and therefore more costly to manufacture. In the present invention, where the term alkali-metal is used, I contemplate both single and mixed alkali metal, such as the preferred sodium alone, or sodium and potassium mixed. I prefer the oxide of potassium not to exceed 50 molar percent of the mixture of oxides of sodium and potassium, for one reason, to keep the fusion point lower and thereby to reduce cost. In addition to these reasons, I have found that in some cases, the desired properties decrease when the molar ratio of $K_2O$ to $Na_2O$ exceeds 20 to 80.

I have made complexes wherein all the alkali metal oxide is $K_2O$, and wherein various ratios of $Na_2O$ to $K_2O$ have been employed, and although they have substantially the same chemical properties for treating water, the physical properties vary. In the particular series tested, as later illustrated, the improvement of lower hygroscopicity of the complex begins to be lost where the $K_2O$ begins to exceed the $Na_2O$.

FUSION

In making the complexes various materials may be combined and heated to fusion, reaction becoming complete when any required dehydration is completed and a melt is obtained which can be quickly chilled to a vitreous mass. Oxides and carbonates of the alkali metals and of the metal M may be used, and phosphoric acid, phosphorus oxides, alkali or other metal phosphates or polyphosphates, so long as the initial ingredients are sufficient in quantity to provide the desired residue. It is preferred to heat above the melting point to insure a crystal-clear glass on chilling.

EXAMPLE 1

A mixture consisting of 23.0 grams C. P. 85% $H_3PO_4$, 5.84 grams C. P. NaOH, and 1.62 grams 97% $Mg(OH)_2$ was heated with gradual rising temperature and was held for one hour at 800–850° C. The clear liquid melt was cooled quickly with the resultant formation of a clear glassy material of the molar ratio: 13.5% MgO, 36.5% $Na_2O$, and 50% $P_2O_5$. This compound is a mixed metal metaphosphate, analytically corresponding to 84.4 molar percent of $NaPO_3$ and 15.6 molar percent of $Mg(PO_3)_2$ or by weight, 75.2% $NaPO_3$ and 24.8% $Mg(PO_3)_2$. On the chart of Fig. 2, it falls at the point designated 40 on line 31.

EXAMPLE 2

A mixture consisting of 23.0 grams C. P. 85% $H_3PO_4$, 7.60 grams C. P. NaOH, and 0.78 gram $Al(OH)_3$ was heated as in Example 1 and held for one hour at 900° C. The clear liquid melt was cooled quickly with the resultant formation of a clear glassy material of the molar ratio: 2.5% $Al_2O_3$, 47.5% $Na_2O$, and 50% $P_2O_5$. This is a mixed metal polyphosphate, analytically corresponding to a product made from 2.45 parts $Al_2O_3$, 29.0 parts $Na_2O$ and 68.5 parts $P_2O_5$ by weight. On the chart of Fig. 2, it falls at the point 41, the junction of line 37 and line 31.

From the above examples, it is seen that point 40 falls on the boundary line 31 of the zone for its complex, and that although point 41 lies also on line 31, it falls within the corresponding boundary line 29 for the zone of its complex.

In the following discussions of properties of the complexes as varying within numerous series, the analytical composition by weight or by molar percent is omitted, as well as location of the compounds on the chart of Fig. 2.

SOLUBILITY

Under the head of solubility are included rate of solution in water, and amount soluble in water. A high solubility is desirable for producing concentrated solutions for use. A low rate of solution is desirable for reasons set forth above.

Sodium polyphosphates of the prior art have a very high rate of solution and high total solubility. In addition they tend to congeal into gummy resin-like masses when wetted. According to the present invention complexes may be made which have a low rate of solution, a high solubility, and no tendency to congeal.

To illustrate these properties reference is made to a series of complexes prepared in 10 to 20 mesh granulation. In a vertical tube to form a bed 1¾ inch in diameter and 1.25 inches high, containing 15 grams of a complex, cold water was passed at the average rate of 100 cc. per minute for 4 hours. The amount of complex dissolved was determined by analysis of the discharge for $P_2O_5$, expressed as parts per million (P. P. M.) $P_2O_5$ dissolved by the water. The compositions of the series were according to Table 2, which also gives the P. P. M. $P_2O_5$.

Table 2—Rate of solution

| Item | Molar ratio | | | P. P. M. $P_2O_5$ dissolved |
|---|---|---|---|---|
| | Mgo | $Na_2O$ | $P_2O_5$ | |
| 1 | 6.5 | 43.5 | 50.0 | 90.0 |
| 2 | 13.5 | 36.5 | 50.0 | 2.5 |
| 3 | 7.0 | 46.5 | 46.5 | 125.0 |
| 4 | 15.4 | 42.3 | 42.3 | 2.5 |

Table 2 shows that the higher content of MgO greatly lowers the rate of solution. Items 2 and 4 with a low rate of solution retain their granular form without congealing or swelling, and become dry when exposed to air. All the items permit making a 25% solution. The rate of solution varies with the composition of the complex. By changing the MgO to $Fe_2O_3$ or BaO, about one-third and five-fourths respectively of the molar amount for MgO is required for the same effectiveness in securing low rate of solution.

The items 2 and 4 having low rate of solution are within the practical range of effectiveness for inhibition action, and because they do not congeal, they may be used as filter beds for flowing water over the material in treating the water. Other new uses are permitted which likewise have been impossible heretofore, when only the sodium polyphosphates have been available.

It may be stated also that as the alkali-metal content of the complex increases, the desirable physical property values decrease. The preferred complexes lie on or near the lines 29 and 31 bounding the composition zones.

The chemical utility of the complexes for treating water is retained so long as the complex is soluble. As the content of metal M increases, and as the content of alkali metal decreases, the solubilities decrease, as a general rule, exemplified more particularly hereinafter by detailed discussion of the $MgO$-$Na_2O$-$P_2O_5$ system.

In the areas of Fig. 2 from line 23—24 of the sodium polyphosphates, to the preferred practical limits of lines 33 for M''', line 35 for MgO, and line 36 for the alkali earth metals, all the complexes are soluble to form 25% solutions in water.

In Fig. 2, the point 43 represents the composition with molar percentages of:

| | Per cent |
|---|---|
| MgO | 30 |
| $Na_2O$ | 20 |
| $P_2O_5$ | 50 |

This compound is practically insoluble in water, and in dilute and concentrated hydrochloric acid or nitric acid. Yet it is perceptibly soluble in water as shown by the right end of the graph of Fig. 8. The term "water-soluble" includes any solubility at all, because mere traces in solution are highly effective. As the composition may be varied on the line of constancy for MgO to increase the Na₂O content at the expense of P₂O₅, the solubility becomes more preceptible. Also as the composition may be varied from point 43 on line 31, the solubility becomes more perceptible, until at the junction of lines 31 and 35 it is extremely useful and in the preferred practical field. The change from solubility to insolubility is gradual and does not permit of defining a limit except in terms of some arbitrarily selected limit. When absolute insolubility is present, the complex is not useful for water treatment. Where a useful solubility is present, the complex may be employed for water treatment. Therefore, I designate the complexes within the scope of the present invention, which are useful for water treatment, as those vitreous glasses consisting analytically of the defined mixed-metal polyphosphates, which are water-soluble.

HYGROSCOPICITY

The sodium polyphosphates have undesirable hygroscopicity, such that compounding of them into dry powdery masses is impossible. Thus, a mixture of equal parts of sodium metasilicate, crystalline trisodium phosphate, and dry sodium polyphosphate, exposed for 24 hours at 75% relative humidity at room temperature, becomes moist and sticky, and will cake on drying out. However, in a like composition having equal parts by weight of:

Crystalline sodium metasilicate
Crystalline trisodium phosphate
Polyphosphate complex { MgO 6.5 moles
Na₂O 43.5 moles
P₂O₅ 50.0 moles the mixture is stable and unaffected by such conditions, and has the same chemical properties as the caking mixture, for example when used as a water-softening dish-washing compound.

The improvement in decreased hygroscopicity is further evidenced by a series of complexes exposed to air for 2 hours at 85° F. of 65% relative humidity in a humidity-control cabinet. The results are shown in Table 3.

STABILITY

The polyphosphates of the prior art and of the present invention revert in water to orthophosphates, which lack the valuable water-treating properties. The rate of reversion in cold water is slow, permitting practical use of cold water solutions. In hot water, the prior art sodium polyphosphates revert rapidly making them less efficient for use to prevent scale in boilers and heat-exchangers. At 100° C., the rate of reversion is so fast, that they are generally considered unstable.

The complexes of the present invention are much more stable in hot water solutions. They retain their unique properties for a longer period in hot water than the prior art sodium polyphosphates. This is evidenced by comparison of a prior art sodium polyphosphate and of a complex of the present invention as shown, below in Table 4. In the test a 2% solution of each complex in water was boiled in a reflux apparatus to prevent concentration, and the orthophosphate content determined at intervals as a measure of the per cent of the original complex which reverts to orthophosphate.

*Table 4—Stability*

| Molar ratio of complex used | | | Percent reversion in— | | | |
|---|---|---|---|---|---|---|
| MgO | Na₂O | P₂O₅ | 1 hour | 2 hours | 5 hours | 7 hours |
| ----- | 50.0 | 50.0 | 18 | 32 | 50 | 67 |
| 6.5 | 43.5 | 50.0 | 13 | 22 | 36 | 42 |

From a plot of these data it may be seen that at about 7 and 4 hours the new complex has the status of the old at about 3 and 2 hours respectively and also that the rate of reversion is much lower. Thus, the new complexes are more efficient for hot waters, and also permit of uses heretofore not practicable.

INHIBITION

The use of polyphosphates to prevent precipitation of calcium and magnesium compounds

*Table 3—Hygroscopicity*

| Item | Molar ratio | | | | | | | | Per cent gain in H₂O |
|---|---|---|---|---|---|---|---|---|---|
| | MgO | CaO | SrO | BaO | Al₂O₃ | Fe₂O₃ | Na₂O | P₂O₅ | |
| 1 | | | | | | | 50.0 | 50.0 | 7.4 |
| 2 | | | | | | 3.5 | 42.9 | 53.6 | 0.05 |
| 3 | | | | | 2.5 | | 47.5 | 50.0 | 1.3 |
| 4 | | | | 10.0 | | | 40.0 | 50.0 | 0.56 |
| 5 | | | | 16.5 | | | 33.5 | 50.0 | 0.13 |
| 6 | | | 10.0 | | | | 40.0 | 50.0 | 0.36 |
| 7 | | | 16.5 | | | | 33.5 | 50.0 | 0.13 |
| 8 | | 6.5 | | | | | 43.5 | 50.0 | 1.75 |
| 9 | | 13.5 | | | | | 36.5 | 50.0 | 0.35 |
| 10 | 4.5 | | | | | | 45.5 | 50.0 | 2.65 |
| 11 | 10.0 | | | | | | 40.0 | 50.0 | 0.35 |
| 12 | 13.5 | | | | | | 36.5 | 50.0 | 0.20 |
| 13 | | | | | | | 62.5 | 37.5 | 11.0 |
| 14 | 11.3 | | | | | | 50.6 | 38.1 | 5.5 |

In general it is shown that as the total molar metal oxide content increases, the hygroscopicity increases. Items 1 and 13 are sodium polyphosphates of the prior art, and show by contrast the improvement in decreased hygroscopicity caused by the presence of oxide of metal M. The chemical water-treating properties remain substantially the same as the sodium polyphosphates, so that by varying the kind and amount of oxide of metal M, it is possible to control hygroscopicity.

from the "hardness" constituents of waters containing such hardening ions, is practically limited to the use of only a few parts of the polyphosphates per million parts of water. The complexes of the present invention have this power of inhibition to high degree, and this power is also present in complexes falling within the polyphosphate zones M″ and M‴ of Fig. 2, beyond the limiting lines 33, 35 and 36 already described. For inhibition uses such complexes beyond these lines are considered to fall within the broad scope of the present invention, but the preferred complexes lie in the areas expressed as preferred, because of their valuable combinations of properties, such as low hygroscopicity, low but useful rate of solution and stability, whereby they are more universally useful.

The value of the complexes for inhibition is evidenced by the results given in Table 5. Water containing calcium bicarbonate as the hardness agent, in amount equivalent to a hardness of 1000 P. P. M. of $CaCO_3$ was treated with 2 P. P. M. of the complexes shown in the table, and held for one hour at 80° C., which conditions normally induce precipitation of $CaCO_3$. The amount of precipitation was determined and is given in Table 5 as percent of total hardness precipitated.

Table 5—Inhibition

| Item | Molar ratio of complex | | | | Percent precipitation |
|---|---|---|---|---|---|
| | MgO | $Al_2O_3$ | $Na_2O$ | $P_2O_5$ | |
| 1 | | | 50.0 | 50.0 | 21.5 |
| 2 | 13.5 | | 36.5 | 50.0 | 15.5 |
| 3 | | 2.5 | 47.5 | 50.0 | 10.5 |
| 4 | 3.8 | | 53.6 | 42.6 | 12.5 |
| 5 | 0 | 0 | 0 | 0 | 45 to 50 |

Item 5 shows that no treatment causes about half the calcium to precipitate, and item 1 shows that the prior art sodium polyphosphate reduces this to 21.5%. The new complexes of items 2, 3 and 4 reduce this still further, and therefore evidence greater power for inhibition under these conditions.

SEQUESTRATION

That union of calcium or magnesium ions of hard water with a polyphosphate, which prevents reaction of the ion with soap, that is the action of sequestration, is as characteristic of the new complexes as of the prior art sodium polyphosphates. It is shown below that a magnesium-sodium-polyphosphate changes little in its high sequestering power from about 0 to 10% molar ratio of MgO, starting from the sodium metaphosphate variety. But as shown above the hygroscopicity decreases as the MgO content increases, such that at 10 molar percent of MgO, it is useful in a dry powdery dish-washing compound. In other cases, the complex may be selected for some desirable physical property.

The effectiveness of the new complexes, compared to a prior art sodium polyphosphate, is evidenced in Table 6. A liter of water containing 13.5 grams of hardness as $CaCO_3$, was treated with varying amounts of numerous new complexes until the water was fully softened against soap. The amount of the complex so required is given in the table.

Item 1 represents prior art, and it is seen from items 2 and 3 that the sequestering property is not altered by the MgO content. All the complexes are of the same order of utility for sequestering. Thus a complex may be selected having the most favorable physical properties for the use intended.

ALKALI-METAL OXIDE

The effect of changing all or part of the $Na_2O$ of the new complexes, to $K_2O$ is illustrated in Table 7. A definite formulation has been chosen in which the molecular ratios of MgO, $P_2O_5$ and alkali metal are fixed, and the alkali metal is progressively changed from all $Na_2O$ to all $K_2O$. The measured effect is hygroscopicity, given as the gain in percent by weight of water in 2 hours at 90° F. at 65% relative humidity, using granular material of substantially the same fineness.

Table 7—$Na_2O$—$K_2O$

| Item | Molar ratio of complex | | | | Hygroscopicity (gain in percent water) |
|---|---|---|---|---|---|
| | MgO | $P_2O_5$ | $Na_2O$ | $K_2O$ | |
| 1 | 10 | 50 | 40 | 0 | 0.6 |
| 2 | 10 | 50 | 36 | 4 | 0.5 |
| 3 | 10 | 50 | 30 | 10 | 0.5 |
| 4 | 10 | 50 | 20 | 20 | 1.5 |
| 5 | 10 | 50 | 0 | 40 | 9.0 |

The five items above possess substantially the same value for inhibition and sequestration, and until $K_2O$ begins to predominate the alkali-metal oxide component, the hygroscopicity remains low. The preferred compounds therefore have at least 50% of the alkali metal as $Na_2O$.

SELECTION OF COMPLEXES

The specific properties vary according to the composition of the complex, and the effects of changes are more particularly reflected in the physical properties than in the chemical water-treating properties. Thus, with sufficient or full knowledge of any given system, it is possible to select a composition having an optimum combination of properties. The manner in which this may be done will become apparent from the following detailed explanation of variations in properties for one system.

THE POLYPHOSPHATE SYSTEM MgO—$Na_2O$—$P_2O_5$

Numerous complexes in this system have been selected to demonstrate the variations in properties. In Fig. 3, a portion of Fig. 2 has been reproduced with the same indicia. The lines 23—24, 31 and 32 outline the more useful end of the zone for the system. Line 23—24 is the line of prior art polyphosphates. Line 50 represents series A of complexes, the properties of Table 6—Sequestration

| Item | Molar ratio of complex | | | | | | | | Gms. required to soften |
|---|---|---|---|---|---|---|---|---|---|
| | MgO | CaO | SrO | BaO | $Fe_2O_3$ | $Al_2O_3$ | $Na_2O$ | $P_2O_5$ | |
| 1 | | | | | | | 50.0 | 50.0 | 1.60 |
| 2 | 4.5 | | | | | | 45.5 | 50.0 | 1.60 |
| 3 | 10.0 | | | | | | 40.0 | 50.0 | 1.60 |
| 4 | | 10.0 | | | | | 40.0 | 50.0 | 1.80 |
| 5 | | | 10.0 | | | | 40.0 | 50.0 | 1.60 |
| 6 | | | | 10.0 | | | 40.0 | 50.0 | 1.60 |
| 7 | | | | | | 2.5 | 47.5 | 50.0 | 1.80 |
| 8 | 13.5 | | | | | | 36.5 | 50.0 | 2.40 |
| 9 | | | | 16.5 | | | 33.5 | 50.0 | 2.40 |
| 10 | | | | | 3.5 | | 42.9 | 53.6 | 2.80 |
| 11 | | | | | | | 62.5 | 37.5 | 2.00 |
| 12 | 6.25 | | | | | | 50.0 | 43.75 | 2.40 |
| 13 | 3.8 | | | | | | 53.6 | 42.6 | 2.00 | which are illustrated in other figures. Table 8 gives the formula for series A, and for other series B, C and D, identifying the series and formula with lines 50, 51, 52 and 31 in Fig. 3.

Table 8

| In Fig. 3 | | Ratios in complex |
|---|---|---|
| Series | Line | |
| A | 50 | Molar % MgO=molar % Na$_2$O—50 |
| B | 51 | Molar % Na$_2$O=50 |
| C | 52 | Molar % P$_2$O$_5$=molar % Na$_2$O |
| D | 31 | Molar % P$_2$O$_5$=50 |

In graph-form figures about to be described, the complexes are identified by the "series" indicia, from which the composition may be determined by reference to the graph and to Table 8.

FIG. 4 HYGROSCOPICITY

Series A, B, C and D, and prior art complexes, have been tested to determine the gain in weight by adding water, in 2 hours, at 85° F. at 65% relative humidity. The percent gain in weight is plotted vertically in Fig. 4. Horizontally, the molar percents of MgO for the series A, B, C and D are plotted, giving the curves respectively 55, 56, 57 and 58 for the said series. Point 59, common to the curves represents the hygroscopicity of the complex of point 23 in Figs. 2 and 3, of sodium hexametaphosphate. Point 60 represents another sodium polyphosphate of composition at point 61 on Fig. 3.

Line 59—60 in Fig. 4 represents the hygroscopicity of complexes on the line 23—61 in Fig. 3. Lines 55, 56, 57 and 58 represent the hygroscopicities of complexes respectively on lines 50, 51, 52 and 31 in Fig. 3. The composition lines in Fig. 3: 23—24, 50, 51, 52 and 31, and the hygroscopicity lines: 59—60, 55, 56, 57 and 58 in Fig. 4 follow a corresponding generally fan-shaped pattern, showing a definite order in changes of hygroscopicity with changes in composition. The fact that line 55 of series A shows hygroscopicity increasing with increasing content of MgO, does not indicate that this series is disadvantageous, for the reference base for measured improvement in Fig. 4 is not the point 59, but rather, it is the line 59—60, in accordance with the said pattern.

FIG. 5 SEQUESTRATION

In Fig. 5 has been plotted vertically the grams of complex required to soften against soap, 1 liter of water having 13.5 grains of hardness as CaCO$_3$. Horizontally, has been plotted the molar percent of MgO in the complexes of series A, B, C and D. Point 63 represents the sequestering power of sodium hexametaphosphate of point 23 in Fig. 3. Lines 64, 65, 66 and 67, represent the amount of complexes of the indicated series required to soften the water.

The curves follow a system in definite order with the fan-shaped pattern in Fig. 3 of lines 50, 51, 52 and 31. It is shown that within certain limits, for example up to 10 molar percent of MgO on line 31 in Fig. 3, or up to point 68 on said line, the new complex is fully as efficient as sodium hexamethaphosphate, an important difference being (see Fig. 4) that the new complex (point 68) is practically non-hygroscopic.

FIG. 6, INHIBITION

In Fig. 6 is plotted vertically the amount of CaCO$_3$ precipitated from a water hardened with calcium bicarbonate, of 1000 P. P. M. CaCO$_3$, by heating for 1 hour at 80° C. in the presence of 2 P. P. M. of a complex. Horizontally, is plotted the molar percent of MgO in the complex. The line marked 70 is the amount, as a range, which is precipitated when no complex is added. Consequently, the lower the curves in the plot, the more efficient is the complex for inhibition under the described conditions. Curves 71, 72, 73 and 74 respectively represent the results for series A, B, C and D.

Series D falls on line 31 in Fig. 3, and it shows that the inhibiting power gradually improves as the MgO content increases, being constant from about 14 to at least 30 molar percent. For series A, the inhibiting power has maximums greater than for series D. The pattern of the curves up to about 5 molar percent of MgO follows a definite order of a fanlike pattern like the series lines in Fig. 3. All the compositions shown are better than sodium hexametaphosphate, found at point 75 in Fig. 6 and point 23 in Fig. 3.

COMPARISON OF SYSTEMS VARYING M

In Fig. 7, a comparison of systems has been made as to hygroscopicity, on complexes of nearly the same order, varying in the metal M. The complexes compared are the sodium-M-polyphosphates. Where M is divalent, the metaphosphates on line 31 of Fig. 2 are used. Where M is Fe the metaphosphate on line 29 of Fig. 2 is used. Where M is Al the polyphosphates on line 31 of Fig. 2 are used.

In Fig. 7 the hygroscopicity is plotted vertically in the same terms as for Fig. 4. Horizontally, is plotted the molar percent of metal M. It has been found that the values for M'' as Mg, and for M'' as Ca, Sr, or Ba are substantially the same, and one curve 80 has been drawn to represent the hygroscopicity of such sodium-M''-metaphosphates. Curve 81 represents the hygroscopicity of sodium-aluminum polyphosphates, falling on line 31 in Fig. 2. Point 82 represents the hygroscopicity of a sodium-iron-metaphosphate, falling on line 29 in Fig. 2.

These show that the trivalent metal M is more effective to lower hygroscopicity than divalent metal M, and that for this function the divalent metals Mg, Ca, Sr, and Ba are substantially equivalent.

SOLUBILITY

As stated above the term solubility comprehends rate of solution and amount of material capable of being dissolved in a given amount of water at a given temperature. A precise value for the latter property is a characteristic of many chemical salts. However, there are other factors which sometimes make it difficult to determine total solubility or to determine if there is a total solubility.

The glasses of the present invention offer such obstacles. As stated above there is a reversion reaction which is slow at low temperatures and more rapid at elevated temperatures. It has been shown that the glasses exhibit varying rates of solution. It is readily to be understood that conditions may exist such that the rate of reversion may exceed the rate of solution, or so nearly approach it, that it could be difficult to secure efficient solutions for water treatment with slowly soluble glasses. However, such glasses and their solutions have effective fertilizer value.

The characteristics of the glasses to dissolve are illustrated by reference to the system of series D, wherein the molar percent of $P_2O_5$ is 50, and the contents of $Na_2O$ and MgO are varied.

Using a temperature in the range from 25° to 30° C., the effects of composition, fineness of division, amount of solid in contact with water, and time of contact with water, have been studied as factors involved in dissolution of the glasses in water.

Fig. 8 shows a curve 85 representing the concentration of solution produced, using powdered material passing a 60-mesh screen, in the quantity of 100 grams of solid per 100 grams of water under standardized conditions for 10 hours. The glass composition was varied so as to show the effect of increasing content of MgO upon the concentration of solution thus obtained. At about 15 molar percent of MgO, it is seen that the solubility, as plotted in terms of grams of dissolved glass in 100 grams of solution, begins to drop. Thus, for making solutions to be added to water, the more soluble forms up to about 15% are preferred. When water may be allowed to flow through a bed of glass, a higher content of MgO may be present advantageously.

In Fig. 8, the expressed solubility at 30 molar percent MgO is 2.47 from the 60-mesh glass. Where glass of the same composition was used, which passed a 200-mesh screen, the expressed solubility was found to be 3.39, showing greater fineness aided dissolution.

Using glass of the 30 molar percent MgO which passes a 200-mesh screen, the quantity exposed for 10 hours was varied showing results as follows:

| Quantity exposed to 100 grams water | Expressed solubility |
| --- | --- |
| 1.0 gram | 0.11 |
| 10.0 grams | 0.70 |
| 100.0 grams | 3.39 |

From the foregoing it is to be noted that in the largest use, the water had capacity for at least 3.39 grams in solution, yet in the smallest use the 1 gram employed dissolved only to the extent of 11%, far below the said capacity of the water. A slow rate of solution is evident.

The time of contact was extended using the same glass of 30 molar percent MgO passing a 200-mesh screen. The results were as follows:

| Hours exposed | Expressed solubility |
| --- | --- |
| 10 | 3.39 |
| 36 | 5.29 |

All of these results show the desirability of flowing water through a bed or over a bed of the divided glass, controlling rate, composition, and contact, in order to secure the desired addition of the treating agent to the water involved. Some compositions may be dissolved in a few minutes, others not. A complex of 20 molar percent MgO at 60-mesh granulation with an equal weight of water will form a 25% solution in 10 hours, but it is practically impossible to obtain complete solution of 1 gram of a complex of 15 molar percent MgO in 100 grams of water in 10 hours at 25° C. The circumstances of use will determine what type of composition is to be selected for its solubility characteristics in such use.

The complexes of the present invention appear to have an almost infinite solubility with a rate of solution decreasing as the effective metal M is increased.

The use of such slowly soluble complexes in other fields, such as for fertilizers, takes advantage of the slowness of dissolution. Such useful compositions, as well as many of the rapidly soluble ones, are characterized by no hygroscopicity. This is another valuable property for fertilizer use. The glasses may be used primarily to dispense $P_2O_5$ to soil. Also, they may have $K_2O$ in whole or in part as the alkali metal oxide, with or without calcium as the metal M. Thus, it is possible to make a glass complex within the present invention which provides phosphate with potash, or with lime, or with both, which is non-hygroscopic, and of controlled and slow availability.

The detailed description of certain compounds, and certain uses thereof, are not to be considered as limiting the invention comprehended within the scope of the appended claims.

Reference is made to my copending application, Serial No. 402,725, filed July 17, 1941, as a continuation-in-part of the present application, which is directed to water-treating methods using compounds of the present invention. Also reference is made to my copending application, Serial No. 519,633, filed January 25, 1944, as a continuation-in-part of the present application and of said Serial No. 402,725, which serial No. 519,633 is directed to certain water-treating compositions and methods involving the aluminum compositions of the present disclosure.

I claim:

1. A homogeneous vitreous material as a glassy water-soluble fusion product consisting analytically of the oxides: $A_2O$, $P_2O_5$ and MO wherein $A_2O$ is alkali metal oxide, MO is oxide of divalent metal M, and M is metal selected from the group consisting of magnesium, calcium, strontium and barium, the $P_2O_5$ being present to an extent in the range from 33⅓ to 50 molar per cent of the total molar content of said oxides, the MO being present to an extent in the range from 2.5 to 17.5 molar per cent of said total molar content, and the $A_2O$ being present to an extent ranging upwardly from 32.5 molar per cent of said total molar content.

2. A homogeneous vitreous material as a glassy water-soluble fusion product consisting analytically of the oxides: $A_2O$, $P_2O_5$ and MO wherein $A_2O$ is alkali metal oxide, MO is oxide of divalent metal M, and M is metal selected from the group consisting of magnesium, calcium, strontium and barium, the $P_2O_5$ being present in the range from 33⅓ to 50 molar per cent of the total molar content of said oxides, the MO being present to an extent in the range from 2.5 to 30 molar per cent of said total molar content, and the $A_2O$ being present in quantity ranging upwardly from 20 molar per cent of said total molar content.

3. A homogeneous vitreous material as a glassy water-soluble fusion product consisting analytically of the oxides: $A_2O$, $P_2O_5$ and MO wherein $A_2O$ is alkali metal oxide, MO is oxide of divalent metal M, and M is metal selected from the group consisting of magnesium, calcium, strontium and barium, the composition being defined by the area of a trilinear diagram of molar content of said oxides which area is bounded by the lines as follows: the line of 2.5 molar per cent of MO; the line of 50 molar per cent of $P_2O_5$; the line of 20 molar per cent of $A_2O$; and the line of 33⅓ molar per cent of $P_2O_5$.

4. A homogeneous vitreous material as a glassy water-soluble fusion product consisting analytically of the oxides: $A_2O$, $P_2O_5$ and MO wherein $A_2O$ is alkali metal oxide, MO is oxide of divalent metal M, and M is metal selected from the group consisting of magnesium, calcium, strontium and barium, the composition being defined by the area of a trilinear diagram of molar content of said oxides which area lies on a band across the diagram which band is bounded by lines parallel to one side of the diagram and corresponding respectively to $33\frac{1}{3}$ and 50 molar per cent of $P_2O_5$, said area being bounded parallel to a second side of the diagram by the line corresponding to 2.5 molar per cent of MO, and being bounded parallel to the third side of the diagram by the line of about 20 molar per cent $A_2O$, which latter line intersects the line of 50 molar per cent of $P_2O_5$ at about 30 molar per cent of MO.

5. A homogeneous vitreous material as a glassy water-soluble fusion product consisting analytically of the oxides: $Na_2O$, $P_2O_5$ and MgO, the $P_2O_5$ being present in the range from $33\frac{1}{3}$ to 50 molar per cent of the total molar content of said oxides, the MgO being present to an extent in the range from 2.5 to 15 molar per cent of said total molar content, and said $Na_2O$ being present to an extent ranging upwardly from 35 molar per cent of said total molar content.

6. A homogeneous vitreous material as a glassy water-soluble fusion product consisting analytically of the oxides: $Na_2O$, $P_2O_5$ and MgO, the $P_2O_5$ being present in the range from $33\frac{1}{3}$ to 50 molar per cent of the total molar content of said oxides, the MgO being present to an extent in the range from 2.5 to 30 molar per cent of said total molar content, and said $Na_2O$ being present in quantity ranging upwardly from 20 molar per cent of said total molar content.

7. A homogeneous vitreous material as a glassy water-soluble fusion product consisting analytically of the oxides: $Na_2O$, $P_2O_5$ and MgO, the composition being defined by the area of a trilinear diagram of said oxides which area is bounded by the lines as follows: the line of 2.5 molar per cent of MgO; the line of 50 molar per cent of $P_2O_5$; the line of 20 molar per cent of $Na_2O$; and the line of $33\frac{1}{3}$ molar per cent of $P_2O_5$.

8. A homogeneous vitreous material as a glassy water-soluble fusion product consisting analytically of the oxides: $Na_2O$, $P_2O_5$ and MgO, the composition being defined by the area of a trilinear diagram of said oxides which area lies on an area of a band across the diagram which band is bounded by lines parallel to one side of the diagram and corresponding to $33\frac{1}{3}$ and 50 molar per cent of $P_2O_5$, said area being bounded parallel to a second side of the diagram by the line corresponding to 2.5 molar per cent of MgO, and being bounded parallel to the third side of the diagram by the line of about 20 molar per cent of $Na_2O$, which latter line intersects the line of 50 molar per cent of $P_2O_5$ at about 30 molar per cent of MgO.

9. A homogeneous vitreous material as a glassy water-soluble fusion product consisting analytically of the oxides: $Na_2O$, $P_2O_5$ and MgO, the $P_2O_5$ being present to the extent of substantially 50 molar per cent of the total molar content of said oxides, the MgO being present to an extent in the range from 2.5 to about 30 molar per cent of said total molar content, and the $Na_2O$ correspondingly being present to an extent ranging upwardly from about 20 molar per cent of said total molar content.

10. A homogeneous vitreous material as a glassy water-soluble fusion product consisting analytically of the oxides: $Na_2O$, $P_2O_5$ and MO wherein $Na_2O$ is sodium oxide, MO is oxide of divalent metal M, and M is alkaline earth metal selected from the group consisting of calcium, strontium and barium, the $P_2O_5$ being present to an extent in the range from $33\frac{1}{3}$ to 50 molar per cent of the total molar content of said oxides, the MO being present to an extent in the range from 2.5 to 17.5 molar per cent of said total molar content, and the $Na_2O$ being present to an extent ranging upwardly from 32.5 molar per cent of said total molar content.

11. A homogeneous vitreous material as a glassy water-soluble fusion product consisting analytically of the oxides: $Na_2O$, $P_2O_5$ and CaO, the $P_2O_5$ being present in the range from $33\frac{1}{3}$ to 50 molar per cent of the total molar content of said oxides, the CaO being present to an extent in the range from 2.5 to 17.5 molar per cent of the said total molar content, and the $Na_2O$ being present to an extent ranging upwardly from 32.5 molar per cent of said total molar content.

CHARLES S. KING.